United States Patent [19]

Seelhorst

[11] Patent Number: 4,638,663
[45] Date of Patent: Jan. 27, 1987

[54] LEVEL INDICATING DEVICE FOR LIQUID CONTAINERS

[75] Inventor: Gottfried Seelhorst, Dinklage, Fed. Rep. of Germany

[73] Assignee: Firma Riesselmann & Sohn, Lohne, Fed. Rep. of Germany

[21] Appl. No.: 807,809

[22] Filed: Dec. 11, 1985

[30] Foreign Application Priority Data

Dec. 13, 1984 [DE] Fed. Rep. of Germany ....... 3445475

[51] Int. Cl.$^4$ ...................... H01H 35/18; G01F 23/36
[52] U.S. Cl. .................................. 73/313; 200/84 B; 340/624
[58] Field of Search ................. 73/311, 315, 308, 313; 340/623, 624; 200/84 B

[56] References Cited

U.S. PATENT DOCUMENTS

| | | | |
|---|---|---|---|
| 2,939,125 | 5/1960 | Swanson | 340/623 X |
| 3,935,741 | 2/1976 | Zinsmeyer et al. | 73/311 X |
| 4,194,396 | 3/1980 | Ohsawa et al. | 73/311 |
| 4,500,761 | 2/1985 | Kubota et al. | 340/623 X |

*Primary Examiner*—Daniel M. Yasich
*Attorney, Agent, or Firm*—Collard, Roe & Galgano

[57] ABSTRACT

A level indicating device for liquid filled containers is provided having a floating sensing element which is operatively connected with a signal device, the sensing element having several, preferably three floats arranged on a single plane. The floats are supported on lever arms which are interconnected with each other at a central union. The lever arm union is supported for free movement in a guide disposed approximately in the center of the container and approximately vertically aligned with the surface of the liquid when the liquid is at rest. The longitudinal movement of the lever arm union in the guide caused by changing liquid levels is transmitted to a signal device for monitoring the liquid level.

11 Claims, 5 Drawing Figures

LEVEL INDICATING DEVICE FOR LIQUID CONTAINERS

The present invention relates to a level indicating device for containers holding liquids having a floating sensing element operatively connected with a signal device.

Level indicating devices generally have a float arranged on a lever arm which is deflected in the container as the liquid level in the container rises or falls. This deflection in turn acts on a signal device, which, for example, may be an optical indicating device or a measuring device with a scale or the like. Also, the signal device may be designed in such a way that the indication responds only to preset limit values of the liquid content of a container, for example to a minimum volume of the liquid in the container.

With containers installed in motor vehicles, such as fuel tanks, oil tanks, drinking water tanks, containers for brake fluid, etc., the contents of the containers are subjected to uncontrollable motion. Acceleration of the vehicle or inclined positions of the vehicle cause the liquid level in the container to tilt with respect to the container and thus also with respect to the float supported and guided in the container. Frequently, such tilting of the liquid level signals a false or invalid reading. For example, with brake fluid containers in motor vehicles, such a false or incorrect level indication may indicate that the content of the container has reached a minimum value preset as the minimum filling although the container is in fact adequately filled. Motor vehicles with such automatic monitoring indicators may confuse and worry the driver needlessly because warning lights or the like are activated thereby.

If the float of a level indicating device can be placed relatively accurately in the center of the container, such false level indications as described above will rarely occur when the tilt of the level of the liquid in the container changes. However, as a rule, arranging a float in the center of a container cannot be done, particularly when such fluid containers are divided into compartments by separating walls, such as baffles, or when the container has an asymmetric shape. However, such separating walls and similar installed elements as well as asymmetric shapes are quite commonly found particularly in brake fluid receptacles for motor vehicles and in fuel tanks. Therefore, floats installed in such containers must necessarily be installed in a decentralized position and accordingly indicate false or invalid fluid levels when the vehicle or container is in a tilted position.

It is, therefore, the object of the present invention to provide a level indicating device for liquid containers which cannot accommodate a float disposed in the center thereof, such that false or invalid fluid level readings do not occur, particularly when the container is in a tilted position.

This object is accomplished in accordance with the present invention by the provision of a sensing element having several and preferably three floats arranged on a single plane. These floats are supported on lever arms which are interconnected at a centrally disposed union or joint. This union is supported for free movement in a guide disposed approximately in the center of the container and aligned approximately perpendicularly or vertically with respect to the surface of the fluid when the fluid is in the resting position.

Because of the arrangement of a plurality of floats on a single plane, which is an essential feature of the present invention, any change in tilt of the surface of the fluid has no influence on the joint or union of the lever arms, which is disposed for free movement in the center of the container. The lever arm union or joint can be operatively connected with the signal device. In this way, tilted positions of the container and the like, which change the tilt of the surface of the fluid in the container, are compensated for, so that false or invalid fluid level readings do not occur. The design according to the present invention, i.e., of the sensing element with a plurality of floats connected in a central union or joint, is particularly suitable for a level indicating device for containers which do not permit a central arrangement of a float due to installations such as separating walls and the like.

The guide for the lever arm union is designed in such a way that it maintains the lever arm union in free movement in the center of the container. For transmitting the vertical motion of the union in the guide, a transmitting element can be connected with the union and operatively connected with the signal device. The transmitting element is disposed in such a way that the signal device is influenced only by movement of the lever arm union along the directed guide. Pivoting movements of the lever arms around the union, for example when the tilt of the fluid level in the container changes, have no effect on the transmitting element.

According to another feature of the invention, a hollow cylinder arranged in the container is provided as the guide. If, for example, a container for brake fluid is provided with separating walls, such a hollow cylinder can be readily integrated in one of the separating walls, or arranged in the center of a container in some other way. The hollow cylinder which guides the lever arm union is aligned in such a way that its longitudinal axis extends perpendicularly or vertically with respect to the level of the liquid in the rest position. When change occur in the tilt of the fluid level caused by inclined positions of the container or the like, the union is capable of freely rotating in the hollow cylinder following the tilting or swivelling movement of the floats and their lever arms caused by the changing tilt of the surface of the fluid. However, apart from this rotating movement, the union is adapted to only slide up and down in the longitudinal direction of the hollow cylinder.

In order for the lever arms to be capable of following the buoyant forces of the floats with free mobility, the wall of the hollow cylinder is provided with longitudinal slots, with a lever arm extending through each slot.

According to another feature of the present invention, an interconnection between the lever arm union and the transmitting element, in order to permit a controlled transmission of the motion of the union, is designed in such a way that the union is in the form of a ball joint guided in the hollow cylinder and having a clearance or recess therein in the form of a socket joint, and the transmitting element includes a ball bearing supported in this socket joint. The socket of the ball joint and the ball bearing received therein prevent that pivoting or rotating motions of the union and thus of the socket, which motions are caused by changes in the tilt of the fluid level in the container by way of the floats, from being transmitted to the transmitting element. When pivoting or rotating motions occur, the socket freely rotates on the ball bearing. Only up and down motions of the union within the hollow cylinder and thus of the socket are transmitted to the ball bearing of the transmitting element. Such motions may be exploited for processing by a suitable signal device (e.g. gauge, warning light or alarm, etc.) capable of indicating the fluid level without false or invalid indications of the actual reading.

Of special advantage is the feature that the socket of the lever arm union and the ball bearing associated therewith are capable of being lockingly engaged with each other by means of a snap connection. Such an assemblage facilitates the installation of the ball and socket. For example, the components may be manufactured from plastic material by injection molding. This results in the advantage that a relatively high dimensional accuracy can be maintained, which is very important to assure smoothness of motion between the socket and ball as well as to assure the desired solid and firm seating of the locked snap connection. It is preferable, furthermore, that the transmitting element be a piston guided in the hollow cylinder and having a piston rod with the ball bearing mounted on the free end of the rod. Lifting and lowering motions of the central union of the floats within the guide provided in the form of a hollow cylinder thus effect a motion of the piston which, also, is preferably guided in the hollow cylinder.

With this arrangement, the mechanical components connected with each other and jointly motioned are minimum in number, thus assuring optimal operational safety of the level indicating device of the present invention. The piston, for example, may act on the signal device by having embedded therein a permanent magnet and the signal device may have a reed contact associated with the piston travel.

Usefully, this type of transmission of a change in level of the fluid in a container is particularly useful for brake fluid receptacles for motor vehicles, because such receptacles are normally made of plastic material. Furthermore, the magnetic field of the permanent magnet installed in the piston may penetrate walls, for example the wall of the hollow cylinder serving as the guide, or the separating walls or the outside walls of the container, which means that the reed contact may also be arranged outside of the container.

According to another useful feature of the present invention, the reed contact may be inserted in a hollow chamber of the container, which is accessible from the outside thereof. This arrangement has the advantage that the reed contact and thus the transmitting elements for transmission to the indicator and signal device do not in any way come into contact with the fluid contained in the container. With receptacles made of plastic material, for example brake fluid containers, such a hollow chamber or compartment can be readily shaped when such a container is molded, and the reed contact inserted and secured in the chamber like a cartridge, with the wires for the connection to a signal and indicating device, which, for example, may be instruments mounted on the dashboard of a motor vehicle, extending from the hollow chamber or compartment.

According to yet another feature of the present invention, there is provided a control pin associated with the lever arm union which projects from the hollow cylinder and protrudes from the container through an opening in the container. For example, the control pin may extend up to beneath the lid or cover covering the filler tube of the fluid container. Thus, after removing the cover or lid, the function of the level indicating device according to the present invention can be tested by simply pressing down the control pin, by which the floats are depressed, simulating in this way a low filling level. Thus, the level indicating device can be manually tested at any time for proper functioning, which is advantageous especially with motor vehicles equipped with electronic monitoring and control devices.

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views.

Figure 1:
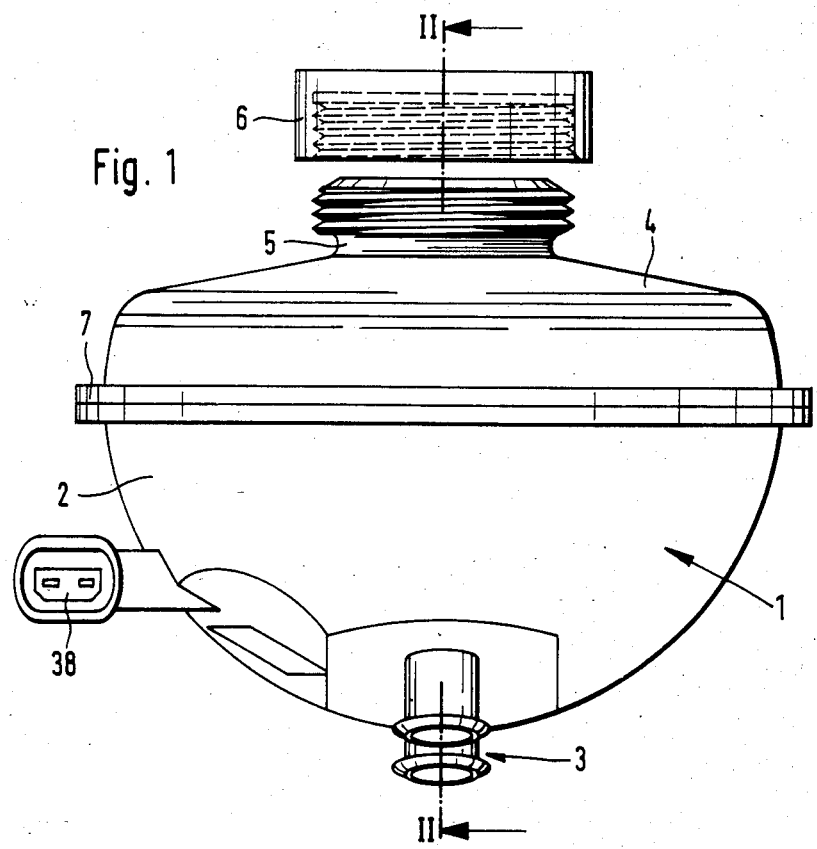
FIG. 1 is a side elevational view of a brake fluid container for motor vehicles.

Now turning to the drawings, there is shown in FIG. 1 a brake fluid container, designated 1, for motor vehicles. The container is made of plastic material and comprised of a bottom part 2 with fluid connections 3 on the bottom, and a top part 4 with a filler neck 5 adapted to be closed by means of a screw cap 6. Bottom part 2 and top part 4 are connected with each other by means of collar flanges 7. Bottom part 2 is provided with an external plug contact 38 for connecting the container to the indicating elements of a signal device such as measuring instruments or the like, which are not shown.

Figure 2:
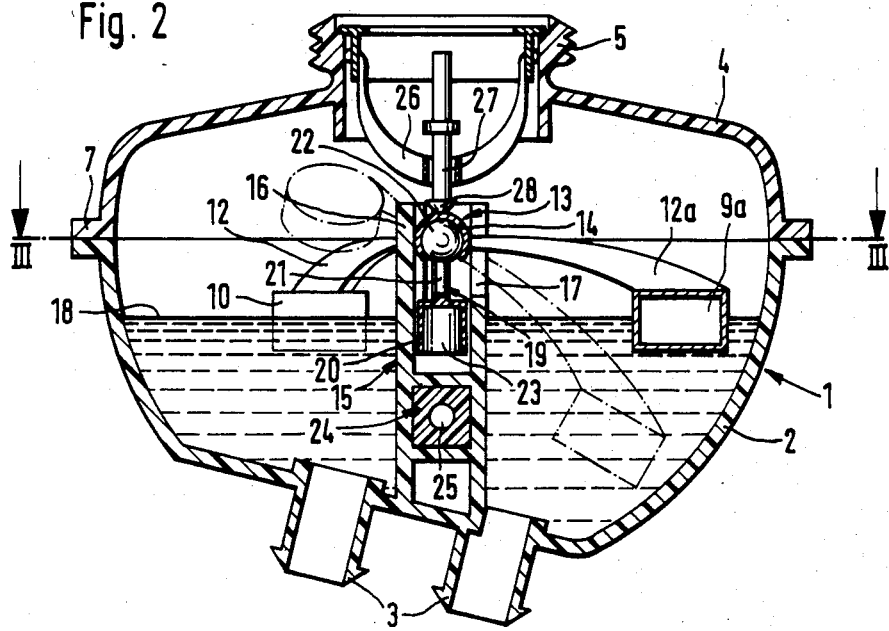
FIG. 2 is a cross-sectional view taken along line II—II of FIG. 1 showing the level indicating device of the present invention.
Figure 3:
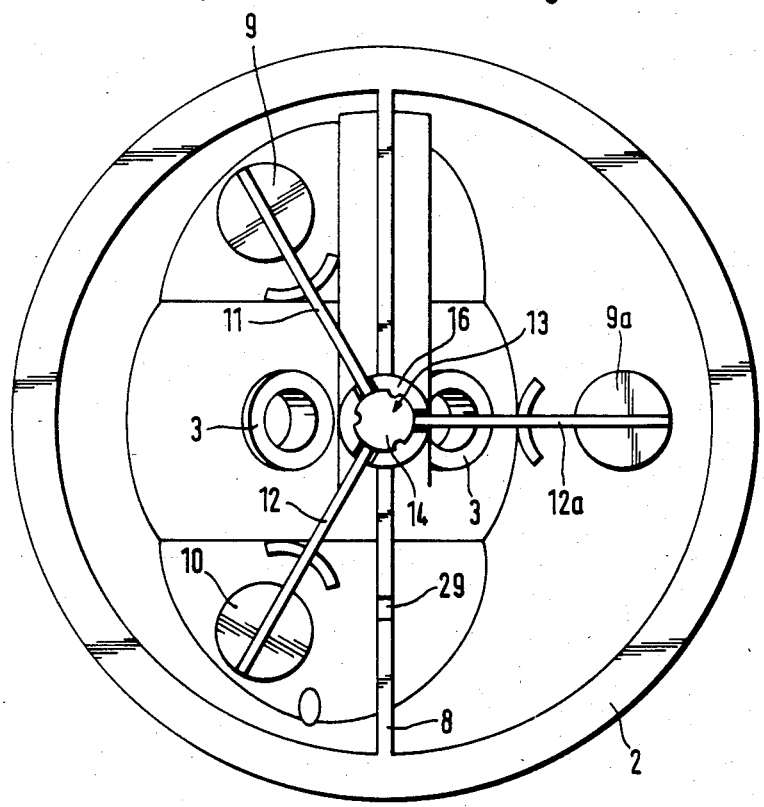
FIG. 3 is a cross-sectional view taken along line III—III of FIG. 2.

As clearly seen in FIGS. 2 and 3, the interior of container 1 is subdivided by a separating wall 8 extending approximately through the center of the container, so that a central float serving as the sensing element could not be arranged therein. With the present embodiment, the sensing element, therefore, consists of three floats, of which only floats 9 and 10 are visible in FIG. 2. These floats are mounted on the ends of lever arms which converge in the center of the container and which are interconnected with each other. Only lever arms 11 and 12, having floats 9 and 10, respectively, mounted thereon, are visible in this figure. The central interconnection of the lever arms forms a junction or a center union 13 which, in the present embodiment, is provided in the form of a socket joint 14. A guide 15 is integrated in separating wall 8 and in the present embodiment is provided in the form of a hollow cylinder 16. The wall of hollow cylinder 16 is provided with longitudinal slots 17 (see FIG. 4). Each longitudinal slot is associated with a lever arm guiding its respective float, and each lever arm extends through the associated slot. In spite of arranging a separating wall in the container it is still possible to arrange guide 15 shaped as a hollow cylinder 16 in the center of the container. Since the floats are capable of free movement in guide 15 by means of union 13 provided in the form of socket joint 14, any change in inclination or tilt of surface 18 of the fluid in the container has no effect on the vertical motion of union 13, such motion taking place only in the longitudinal direction of hollow cylinder 16. The dashed lines of levers 11 and 12 and their respective floats 9 and 10 indicate a position of the floats with the container in a tilted position.

A transmitting element, designated 19, is provided in the form of a piston 20. Piston 20 is guided with relative stability against tilting and thus free from jamming and is provided with a piston rod 21. A ball bearing 22 is seated at the free end of piston rod 21 and is inserted in the socket joint 14 of union 13 by means of a snap connection. Thus, ball bearing 22 is locked in socket 14 by the snap connection.

A permanent magnet 23 is embedded in piston 20. A hollow compartment 24 is formed at the bottom of the hollow cylinder, the compartment being accessible from outside of the container. A reed contact 25, which is known per se, is inserted in hollow compartment 24.

Filler neck 5 in top part 4 of the container is provided with an inserted mounting support 26 guiding a control pin 27 having a tip 28 resting on union 13. After removing screw cap 6 from filler neck 5, the function and operational safety of the level indicating device can be checked and controlled by manually depressing control pin 27, since reed contact 25 inserted in hollow compartment 24 responds when approached by permanent magnet 23 embedded in piston 20. Normally, this response is initiated when level 18 of the fluid in the container drops, followed by the floats. However, as described above, such response can be simulated by depressing control pin 27 by hand.

FIG. 3 clearly shows how the three floats 9, 10 and 9a are supported in the center union 13 disposed between lever arms 11, 12 and 12a. The lever arms form between each other an angle of about 120 degrees. This junction in turn is supported for free movement in guide 15 provided in the form of hollow cylinder 16, guide 15 being integrated in separating wall 8 of the container. Separating wall 8 divides the interior space of the container into two compartments connected with each other by means of an overflow slot 29 provided in the separating wall. In this way, the fluid content of the container is capable of flowing from one compartment into the other. Consequently, the level of the surface of the fluid is always the same in the two compartments.

Figure 4:
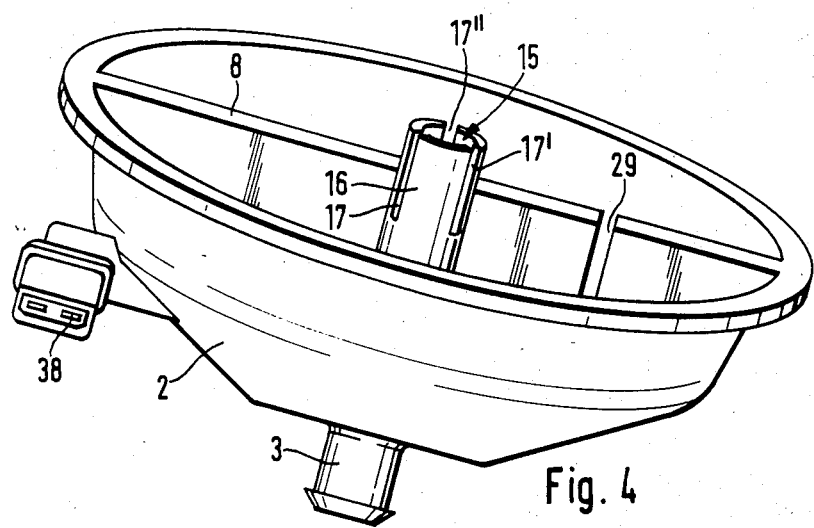
FIG. 4 is a perspective side view of the bottom part of the container of FIG. 1.

FIG. 4 clearly shows that arrangement of separating wall 8 and guide 15 having the form of a hollow cylinder 16. Hollow cylinder 16 has longitudinal slots 17, 17' and 17", which are suggested also in FIG. 2. Reference numeral 29 identifies the overflow slot provided in the separating wall 8.

Figure 5:
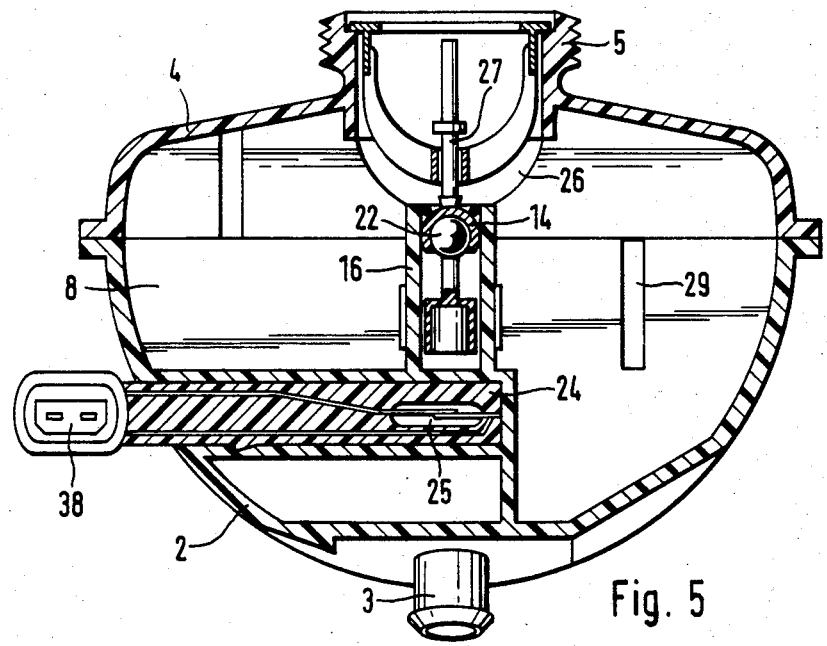
FIG. 5 is a cross-sectional view of the container of FIG. 1 similar to the view of FIG. 2 but turned 90° thereto.

FIG. 5 is a cross-sectional view of the container of FIG. 1, taken along a plane parallel to the plane of the drawing. The floats with their lever arms shown in FIGS. 2 and 3 are not shown in FIG. 5 in order to allow for a clearer view. FIG. 5 clearly illustrates the outwardly extending hollow compartment 24 with a reed contact 25 inserted therein and wired with plug contact 38.

While only a single embodiment of the present invention has been shown and described, it will be obvious that many changes and modifications may be made thereunto without departing from the spirit and scope of the invention.

What is claimed is:

1. A level indicating device for liquid containers comprising:
    (a) a plurality of floats disposed on a single plane in said container;
    (b) a plurality of lever arms, each lever arm supporting one of said floats;
    (c) a guide maintained approximately centrally in said container and approximately vertically with respect to the surface of a liquid in said container when at rest;
    (d) a union supported for free movement in said guide and to which each of said lever arms is connected; and
    (e) said union operatively connected for coaction with means mounted for connection to a signal device to indicate at least one level of the liquid.

2. The level indicating device as defined in claim 1, which further comprises a transmitting element operatively connecting the signal device to said union.

3. The level indicating device as defined in claim 2, wherein said guide is a hollow cylinder disposed in said container.

4. The level indicating device as defined in claim 3, wherein said hollow cylinder has a wall having longitudinal slots, each of said slots being associated with a lever arm extending therethrough.

5. The level indicating device as defined in claim 3, wherein said union is in the form of a ball joint guided in said hollow cylinder, said ball joint of said union having an internal recess shaped as a socket joint, and said transmitting element including a ball bearing rotatably supported in said socket joint of said ball joint.

6. The level indicating device as defined in claim 5, wherein said socket joint and associated ball bearing are adapted to be engaged and locked with each other by means of a snap connection.

7. The level indicating device as defined in claim 5, wherein said transmitting element comprises a piston guided in said hollow cylinder, said piston including a piston rod having said ball bearing disposed at its free end.

8. The level indicating device as defined in claim 7, which further comprises a permanent magnet embedded in said piston, and said signal device including a reed contact associated with the piston travel of said piston.

9. The level indicating device as defined in claim 8, wherein said reed contact is inserted in a hollow chamber of said container, said chamber being accessible from the outside of said container.

10. The level indicating device as defined in claim 1, which further comprises a control pin projecting from said guide and protruding from the container through a container opening, said control pin being associated with said union.

11. The level indicating device as defined in claim 1, wherein said liquid container and said floating sensing element are formed of plastic material.

* * * * *